US012365379B2

(12) United States Patent
Sturgeon et al.

(10) Patent No.: US 12,365,379 B2
(45) Date of Patent: Jul. 22, 2025

(54) PUSH-PULL WAGON

(71) Applicant: The Radio Flyer Company, Chicago, IL (US)

(72) Inventors: Samantha Sturgeon, Chicago, IL (US); Collin Ostergaard, Chicago, IL (US); Scott Padiak, Chicago, IL (US)

(73) Assignee: Leapfrog Product Development LLC, Chicago, IL (US)

( * ) Notice: Subject to any disclaimer, the term of this patent is extended or adjusted under 35 U.S.C. 154(b) by 0 days.

(21) Appl. No.: 17/689,370

(22) Filed: Mar. 8, 2022

(65) Prior Publication Data

US 2022/0194451 A1    Jun. 23, 2022

Related U.S. Application Data

(62) Division of application No. 17/006,153, filed on Aug. 28, 2020, now abandoned.
(Continued)

(51) Int. Cl.
*B62B 3/02* (2006.01)
*B62B 5/04* (2006.01)
*B62B 9/14* (2006.01)

(52) U.S. Cl.
CPC ............ *B62B 3/022* (2013.01); *B62B 5/0433* (2013.01); *B62B 9/142* (2013.01); *B62B 2205/20* (2013.01);
(Continued)

(58) Field of Classification Search
CPC .. B62B 9/104; B62B 9/24; B62B 9/14; B62B 9/102; B62B 9/142; B62B 9/147;
(Continued)

(56) References Cited

U.S. PATENT DOCUMENTS 1,371,198 A    3/1921    Daum
1,465,211 A    8/1923    Dunkelberger
(Continued)

FOREIGN PATENT DOCUMENTS

CN    102166068 B    5/2013
CN    206938795      1/2018
(Continued)

OTHER PUBLICATIONS

Examination Report for Australian application No. 2020337993 dated Mar. 11, 2023 (5 pages).
(Continued)

*Primary Examiner* — James M Dolak
(74) *Attorney, Agent, or Firm* — Barnes & Thornburg LLP

(57) ABSTRACT

A wagon having a wagon frame, a push bar and a handle is provided. The wagon frame has a first end assembly and an opposing second end assembly. First and second rear wheels are rotatably connected to the wagon frame adjacent the second end assembly, and first and second front wheels are rotatably and pivotally connected to the wagon frame adjacent the first end assembly. The handle is pivotally connected to the first end assembly, and the push bar is pivotally connected to the second end assembly. The push bar is lockably positionable in a plurality of use positions and a storage position with a ratchet mechanism.

16 Claims, 14 Drawing Sheets

Related U.S. Application Data

(60) Provisional application No. 62/903,145, filed on Sep. 20, 2019, provisional application No. 62/893,992, filed on Aug. 30, 2019.

(52) U.S. Cl.
CPC ........ *B62B 2205/26* (2013.01); *B62B 2301/04* (2013.01)

(58) Field of Classification Search
CPC .... B62B 9/20; B62B 9/206; B62B 7/062; B62B 7/042; B62B 7/12; B62B 7/06; B62B 7/008; B62B 7/04; B62B 5/064; B62B 5/082; B62B 5/06; B62B 5/08; B62B 5/0433; B62B 5/0461; B62B 5/061; B62B 5/067; B62B 5/007; B62B 3/007; B62B 3/025; B62B 3/00; B62B 3/02; B62B 3/022; B62B 2205/20; B62B 2205/26; B62B 2301/04

See application file for complete search history.

(56) References Cited

U.S. PATENT DOCUMENTS

| | | | |
|---|---|---|---|
| 1,489,443 A | 4/1924 | Kelly | |
| 1,771,813 A | 7/1930 | Norman | |
| 1,820,466 A | 8/1931 | Leiblein | |
| 2,020,766 A | 11/1935 | Brown | |
| 2,471,553 A | 5/1949 | Zuckerman | |
| 2,563,995 A | 8/1951 | East | |
| 2,575,189 A | 11/1951 | Schmidt | |
| 2,942,679 A | 6/1960 | Gibson | |
| 2,984,514 A | 5/1961 | Lemley | |
| 2,989,318 A | 6/1961 | Schenkman | |
| 3,116,935 A | 1/1964 | Mitchin et al. | |
| 3,162,460 A | 12/1964 | Davidson | |
| 3,893,532 A | 7/1975 | Perlowin | |
| 4,227,709 A | 10/1980 | Gradwohl et al. | |
| 4,449,322 A | 5/1984 | Blumenthal | |
| 4,706,986 A | 11/1987 | Kassai | |
| 4,735,426 A * | 4/1988 | McConnell | B62B 7/008 |
| | | | 280/47.35 |
| 4,741,552 A | 5/1988 | Kassai | |
| 4,746,140 A | 5/1988 | Kassai | |
| 4,763,907 A | 8/1988 | Raymond | |
| 4,796,909 A | 1/1989 | Kirkendall | |
| 4,811,968 A | 3/1989 | Bolden | |
| 4,824,137 A | 4/1989 | Bolden | |
| 4,844,493 A | 7/1989 | Kramer | |
| 4,856,810 A | 8/1989 | Smith | |
| 4,878,682 A | 11/1989 | Lee | |
| 4,887,836 A | 12/1989 | Simjian | |
| 5,050,900 A | 9/1991 | Lee | |
| 5,333,893 A | 8/1994 | Chen | |
| 5,360,222 A | 11/1994 | Bro et al. | |
| 5,423,592 A | 6/1995 | Spurrier et al. | |
| 5,538,267 A | 7/1996 | Pasin et al. | |
| 5,657,828 A | 8/1997 | Nagamachi | |
| 5,699,647 A | 12/1997 | Weder et al. | |
| 5,746,282 A | 5/1998 | Fujiwara et al. | |
| 5,791,669 A | 8/1998 | Broddon et al. | |
| 5,806,864 A | 9/1998 | Zielinski et al. | |
| 5,833,251 A | 11/1998 | Peck | |
| 5,857,695 A | 1/1999 | Crowell | |
| 5,876,049 A | 3/1999 | Spear et al. | |
| 5,887,935 A * | 3/1999 | Sack | B62B 9/00 |
| | | | 280/47.38 |
| 5,911,432 A | 6/1999 | Song | |
| 5,915,723 A | 6/1999 | Austin | |
| 5,947,493 A | 9/1999 | Pasin et al. | |
| 5,957,482 A | 9/1999 | Shorter | |
| 6,010,145 A | 1/2000 | Liu | |
| 6,079,720 A | 6/2000 | Spear et al. | |
| 6,079,777 A | 6/2000 | Simmons et al. | |
| 6,142,491 A | 11/2000 | Darling, III | |
| 6,164,671 A | 12/2000 | Darling, III | |
| 6,220,611 B1 | 4/2001 | Shapiro | |
| 6,270,092 B2 | 8/2001 | Darling, III | |
| 6,276,471 B1 | 8/2001 | Kratzenberg et al. | |
| 6,318,740 B1 | 11/2001 | Nappo | |
| D458,648 S | 6/2002 | Chiappetta et al. | |
| 6,488,293 B1 | 12/2002 | Mitchell et al. | |
| 6,491,318 B1 | 12/2002 | Galt et al. | |
| 6,499,750 B1 | 12/2002 | Michelau | |
| 6,536,796 B1 | 3/2003 | Solomon | |
| 6,561,529 B2 | 5/2003 | Darling, III | |
| 6,581,945 B1 | 6/2003 | Shapiro | |
| 6,629,574 B2 | 10/2003 | Turner | |
| D483,419 S | 12/2003 | Chiappetta et al. | |
| 6,663,139 B1 | 12/2003 | Smith | |
| 6,733,026 B1 | 5/2004 | Robberson et al. | |
| 6,845,991 B1 | 1/2005 | Ritucci et al. | |
| 6,893,030 B2 | 5/2005 | Shapiro | |
| 6,908,100 B2 * | 6/2005 | Kassai | B62B 7/123 |
| | | | 280/643 |
| 6,916,028 B2 | 7/2005 | Shapiro | |
| 6,932,365 B2 * | 8/2005 | Chiappetta | B62B 5/06 |
| | | | 280/47.35 |
| 7,017,939 B2 | 3/2006 | Darling, III | |
| 7,066,485 B2 | 6/2006 | Shapiro | |
| 7,097,182 B1 | 8/2006 | Liu | |
| 7,118,115 B2 | 10/2006 | Abel | |
| 7,150,339 B2 | 12/2006 | Liao et al. | |
| 7,150,465 B2 | 12/2006 | Darling, III | |
| 7,163,213 B2 | 1/2007 | Chambers | |
| 7,210,545 B1 | 5/2007 | Waid | |
| 7,226,059 B1 | 6/2007 | Samuels | |
| D547,812 S | 7/2007 | Seckel et al. | |
| 7,284,797 B2 | 10/2007 | Huang | |
| D566,200 S | 4/2008 | Seckel et al. | |
| D570,424 S | 6/2008 | Blair | |
| D573,663 S | 7/2008 | Ogawa | |
| 7,392,994 B2 | 7/2008 | Darling, III | |
| 7,407,177 B2 | 8/2008 | Darling, III | |
| 7,461,857 B2 | 12/2008 | Darling, III | |
| 7,475,900 B2 | 1/2009 | Cheng | |
| 7,487,977 B2 * | 2/2009 | Johnson | B62B 3/007 |
| | | | 280/47.34 |
| 7,490,684 B2 | 2/2009 | Seymour et al. | |
| 7,523,955 B2 | 4/2009 | Blair | |
| 7,547,037 B2 | 6/2009 | Poppinga et al. | |
| 7,562,897 B1 | 7/2009 | Sherman et al. | |
| 7,584,985 B2 | 9/2009 | You et al. | |
| 7,625,033 B2 * | 12/2009 | Michelau | B62B 9/147 |
| | | | 403/328 |
| 7,661,156 B2 | 2/2010 | Thorne et al. | |
| 7,709,795 B2 | 5/2010 | Yamanaka et al. | |
| 7,731,221 B2 | 6/2010 | Bess | |
| 7,775,530 B2 | 8/2010 | Darling, III | |
| 7,823,906 B2 | 11/2010 | Darling, III | |
| 7,836,530 B2 | 11/2010 | Thorne et al. | |
| 8,011,686 B2 | 9/2011 | Chen et al. | |
| 8,060,959 B2 | 11/2011 | Thorne et al. | |
| 8,091,916 B2 | 1/2012 | Shapiro | |
| 8,120,190 B2 | 2/2012 | Bravo | |
| 8,127,392 B2 | 3/2012 | Wilson | |
| 8,191,907 B2 | 6/2012 | Watson | |
| 8,220,824 B2 | 7/2012 | Chen et al. | |
| 8,286,739 B2 | 10/2012 | Oliphant | |
| 8,297,642 B2 | 10/2012 | Tyson, III | |
| 8,388,015 B2 | 3/2013 | Chen | |
| 8,456,771 B2 | 6/2013 | Weber et al. | |
| 8,458,829 B2 | 6/2013 | Thorne et al. | |
| 8,490,732 B2 | 7/2013 | Sugimoto et al. | |
| 8,556,740 B1 | 10/2013 | Schneider | |
| 8,672,081 B2 | 3/2014 | Kume et al. | |
| 8,746,377 B1 | 6/2014 | Dunbar | |
| 8,746,710 B2 | 6/2014 | Schejbal | |
| 8,851,503 B2 * | 10/2014 | Tyson, III | A47C 1/14 |
| | | | 280/648 |
| 8,944,459 B1 | 2/2015 | Hagy | |
| 8,955,855 B2 * | 2/2015 | Herlitz | B62B 9/108 |
| | | | 280/47.38 |

(56) References Cited

U.S. PATENT DOCUMENTS

| | | | |
|---|---|---|---|
| D723,762 S | 3/2015 | Treadwell | |
| 8,973,940 B2 | 3/2015 | Chen et al. | |
| 9,033,361 B2 | 5/2015 | Frankel et al. | |
| 9,045,152 B2 | 6/2015 | Sekine et al. | |
| 9,056,621 B1 | 6/2015 | Jin et al. | |
| 9,073,564 B2 | 7/2015 | Yang et al. | |
| 9,085,311 B1* | 7/2015 | Chen | B62B 3/001 |
| 9,108,656 B1 | 8/2015 | Nolan et al. | |
| D738,436 S | 9/2015 | Cummings | |
| 9,145,154 B1* | 9/2015 | Horowitz | B62B 7/008 |
| 9,211,897 B2 | 12/2015 | Yang et al. | |
| 9,242,663 B1 | 1/2016 | Nolan et al. | |
| D748,739 S | 2/2016 | Horowitz | |
| 9,327,749 B2* | 5/2016 | Young | B62B 5/08 |
| 9,365,225 B2 | 6/2016 | Henao | |
| D763,532 S | 8/2016 | Huang | |
| 9,469,324 B2* | 10/2016 | Bowman | B62B 3/007 |
| 9,580,095 B2 | 2/2017 | Vargas, II et al. | |
| 9,738,298 B1 | 8/2017 | Yang et al. | |
| 9,925,999 B2* | 3/2018 | Young | B62B 5/0073 |
| 9,950,729 B2* | 4/2018 | Choi | B62B 3/007 |
| 9,956,981 B1* | 5/2018 | Fitzwater | E04H 15/60 |
| 10,077,062 B2* | 9/2018 | Bowman | B62B 5/082 |
| 10,081,380 B2 | 9/2018 | Fitzwater et al. | |
| 10,099,711 B1* | 10/2018 | Sun | B62B 3/007 |
| 10,300,934 B2* | 5/2019 | Ostergaard | B62B 3/025 |
| 10,392,042 B2 | 8/2019 | Fitzwater et al. | |
| 10,507,857 B2* | 12/2019 | Bowman | B62B 3/02 |
| 10,525,998 B2* | 1/2020 | Young | B62B 5/0053 |
| 10,562,556 B1* | 2/2020 | Horowitz | B62B 3/007 |
| 10,583,852 B2* | 3/2020 | Fitzwater | B62B 5/082 |
| 10,597,058 B2* | 3/2020 | Bowman | B62B 3/022 |
| 10,633,010 B1* | 4/2020 | Zhang | B62B 3/025 |
| 10,703,399 B2* | 7/2020 | Ostergaard | B62B 3/008 |
| 11,247,708 B2* | 2/2022 | Wang | B62B 3/025 |
| 11,685,416 B2* | 6/2023 | Yang | B62B 3/025 280/651 |
| 11,760,399 B2* | 9/2023 | Bowman | B62B 3/02 280/651 |
| 11,772,698 B2* | 10/2023 | Cui | B62B 7/008 280/650 |
| 11,851,097 B2* | 12/2023 | Chu | B62B 5/067 |
| 11,919,557 B2* | 3/2024 | Pang | B62B 5/00 |
| 11,932,298 B2* | 3/2024 | Sun | B62B 3/007 |
| 11,958,520 B1* | 4/2024 | Sun | B62B 5/067 |
| 11,981,364 B2* | 5/2024 | Ma | B62B 5/0461 |
| 12,012,139 B2* | 6/2024 | Sun | B62B 3/007 |
| 12,037,037 B2* | 7/2024 | Zehfuss | B62B 3/007 |
| 12,122,440 B2* | 10/2024 | Yang | B62B 3/007 |
| 12,221,146 B2* | 2/2025 | Yang | B62B 5/067 |
| 2003/0025301 A1 | 2/2003 | Banuelos, III | |
| 2003/0127835 A1 | 7/2003 | Shapiro | |
| 2003/0227158 A1 | 12/2003 | Kassai et al. | |
| 2004/0164512 A1 | 8/2004 | Gunter et al. | |
| 2004/0238469 A1 | 12/2004 | Ng | |
| 2005/0275195 A1 | 12/2005 | Matula et al. | |
| 2006/0119056 A1 | 6/2006 | Olsen | |
| 2007/0258435 A1 | 11/2007 | Saito et al. | |
| 2007/0284900 A1 | 12/2007 | Sze | |
| 2008/0041644 A1 | 2/2008 | Tudek et al. | |
| 2008/0073880 A1 | 3/2008 | Bess | |
| 2008/0217886 A1 | 9/2008 | Poppinga et al. | |
| 2009/0066114 A1 | 3/2009 | Molton | |
| 2009/0160150 A1 | 6/2009 | Johnson | |
| 2009/0161150 A1 | 6/2009 | Yu et al. | |
| 2010/0123294 A1 | 5/2010 | Ellington et al. | |
| 2010/0140902 A1 | 6/2010 | Zehfuss | |
| 2010/0156069 A1 | 6/2010 | Chen | |
| 2011/0025005 A1 | 2/2011 | Howell | |
| 2011/0204598 A1 | 8/2011 | Stevenson | |
| 2012/0211970 A1 | 8/2012 | Saito et al. | |
| 2012/0235372 A1 | 9/2012 | Herlitz et al. | |
| 2012/0274052 A1 | 11/2012 | Zhu | |
| 2013/0179016 A1 | 7/2013 | Gale | |
| 2013/0239322 A1 | 9/2013 | Thorne et al. | |
| 2014/0001735 A1 | 1/2014 | Yang et al. | |
| 2014/0196968 A1 | 7/2014 | Bieler et al. | |
| 2014/0353945 A1 | 12/2014 | Young et al. | |
| 2015/0035258 A1 | 2/2015 | Chen et al. | |
| 2015/0053042 A1 | 2/2015 | Shirakawa et al. | |
| 2015/0084298 A1 | 3/2015 | Herlitz et al. | |
| 2015/0145224 A1 | 5/2015 | Zhu | |
| 2015/0151771 A1 | 6/2015 | Jin et al. | |
| 2016/0347338 A1 | 12/2016 | Vargas, II et al. | |
| 2018/0057035 A1 | 3/2018 | Choi | |
| 2018/0208227 A1 | 7/2018 | Young et al. | |
| 2019/0023299 A1 | 1/2019 | Simmons et al. | |
| 2019/0185038 A1 | 6/2019 | Choi | |

FOREIGN PATENT DOCUMENTS

| | | |
|---|---|---|
| GB | 190407310 A | 8/1904 |
| JP | 2001-1706 | 1/2001 |
| JP | 2008239149 A | 10/2008 |
| JP | 2009-137521 | 6/2009 |
| JP | 2010-184696 | 8/2010 |
| JP | 2018520050 A | 7/2018 |
| KR | 101662201 B1 | 10/2016 |
| KR | 101697544 B1 | 1/2017 |
| WO | 2018080664 A1 | 5/2018 |

OTHER PUBLICATIONS

"Creative outdoor distributor push/pull wagon for kids," accessed online at: https://shorturl.at/bPW13 (viewed online Mar. 11, 2023).

International Search Report and Written Opinion issued to PCT/US20/56827, mailed Jan. 21, 2021 (16 pages).

International Preliminary Report on Patentability issued to PCT/US20/56827, mailed May 5, 2022 (9 pages).

International Search Report and Written Opinion issued to PCT/US20/24924, mailed Jan. 11, 2021 (17 pages).

International Search Report and Written Opinion issued to PCT/US20/48493, mailed Nov. 20, 2020 (12 pages).

International Search Report and Written Opinion issued to PCT/US2020/056827, mailed Jan. 21, 2021 (16 pages).

Office Action for Japanese application No. 2021-572685 dated Aug. 2, 2024 (5 pages).

Office Action for Japanese application No. 10-2021-7038604 dated Jan. 22, 2025 (14 pages).

\* cited by examiner

PUSH-PULL WAGON

CROSS-REFERENCE TO RELATED APPLICATIONS

This application claims the benefit of U.S. Provisional Patent Application No. 62/893,992 filed Aug. 30, 2019, U.S. Provisional Patent Application No. 62/903,145 filed Sep. 20, 2019, and U.S. patent application Ser. No. 17/006,153 filed Aug. 28, 2020, all of which are expressly incorporated herein by reference and made a part hereof.

FEDERALLY SPONSORED RESEARCH OR DEVELOPMENT

Not Applicable.

TECHNICAL FIELD

The present disclosure relates generally to wagons, and more specifically to a wagon that has push and pull functionality.

BACKGROUND

Wagons are used throughout the world and are well known in the art. While such wagons according to the prior art provide a number of advantages, they nevertheless have certain limitations. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a wagon having a push handle or bar and a pull handle.

The disclosed technology further relates to a wagon comprising: a wagon frame having a first end assembly and an opposing second end assembly; a floor assembly connected to the wagon frame between the first end assembly and the second end assembly, wherein the wagon frame folds between an open configuration and a folded configuration; first and second rear wheels rotatably connected to the wagon frame adjacent the second end assembly; first and second front wheels rotatably and pivotally connected to the wagon frame adjacent the first end assembly; a handle pivotally connected to the first end assembly; and, a push bar pivotally connected to the second end assembly, the push bar lockably positionable in a plurality of use positions and a storage position.

The disclosed technology further relates to a wagon comprising: a wagon frame having a first end assembly and an opposing second end assembly; first and second rear wheels rotatably connected to the wagon frame adjacent the second end assembly; first and second front wheels rotatably and pivotally connected to the wagon frame adjacent the first end assembly; and, a push bar pivotally connected to the second end assembly with a ratchet mechanism, wherein the push bar is lockably positionable in a plurality of angularly located use positions via the ratchet mechanism.

The disclosed technology further relates to a wagon comprising: a wagon frame having a first end assembly and an opposing second end assembly; first and second rear wheels rotatably connected to the wagon frame adjacent the second end assembly; first and second front wheels rotatably and pivotally connected to the wagon frame adjacent the first end assembly; a push bar connected to the wagon frame; and, a handle pivotally connected to the first end assembly, wherein the handle is spring loaded and biased toward the first end assembly, and wherein the handle has a pivot member with a cam surface to removably secure the handle in a vertical position.

The disclosed technology further relates to a wagon, wherein the handle is pivotally connected to the first end assembly, wherein the handle is spring loaded and biased toward the first end assembly.

The disclosed technology further relates to a wagon, wherein the handle has a pivot member with a cam surface to removably secure the handle in a vertical position.

The disclosed technology further relates to a wagon, wherein the cam is a raised protrusion extending from an arcuate outer surface of the pivot member, and wherein the cam has a generally flat surface toward a center thereof that engages a mating wall to operate as a stop.

The disclosed technology further relates to a wagon, further comprising a fabric housing on the wagon frame.

The disclosed technology further relates to a wagon, wherein the push bar is connected to the second end assembly with a ratchet mechanism.

The disclosed technology further relates to a wagon, further comprising a spring-loaded button to disengage a ratchet in the ratchet mechanism to adjust an angular position of the push bar.

The disclosed technology further relates to a wagon, wherein the push bar is lockably positionable in a plurality of angularly located use positions via the ratchet mechanism.

The disclosed technology further relates to a wagon, further comprising a foot activated brake mechanism adjacent the second end assembly to rotationally lock at least one of the rear wheels.

The disclosed technology further relates to a wagon, further comprising a removable canopy connected to telescoping posts that are secured to the wagon frame.

The disclosed technology further relates to a wagon, wherein the floor assembly comprises a first floor assembly pivotal with respect to the first end assembly, and a second floor assembly pivotal with respect to the second end assembly, and wherein the first floor assembly is pivotable with respect to the second floor assembly to allow for folding of the wagon frame.

The disclosed technology further relates to a wagon, further comprising a linkage assembly under the floor assembly, the linkage assembly having a first linkage pivotally connected to the first end assembly and a second linkage pivotally connected to the second end assembly, wherein the first linkage is also pivotally connected to the second linkage.

The disclosed technology further relates to a wagon, wherein the wagon frame folds between an open configuration and a folded configuration, wherein the wagon frame has a floor assembly between the first end assembly and the second end assembly, wherein the floor assembly comprises a first floor assembly pivotal with respect to the first end assembly, and a second floor assembly pivotal with respect to the second end assembly, and wherein the first floor assembly is pivotable with respect to the second floor assembly to allow for folding of the wagon frame, wherein the wagon frame further has a linkage assembly under the floor assembly, the linkage assembly having a first linkage pivotally connected to the first end assembly and a second linkage pivotally connected to the second end assembly, wherein the first linkage is also pivotally connected to the second linkage.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure. In the drawings.

DETAILED DESCRIPTION

Figure 1:
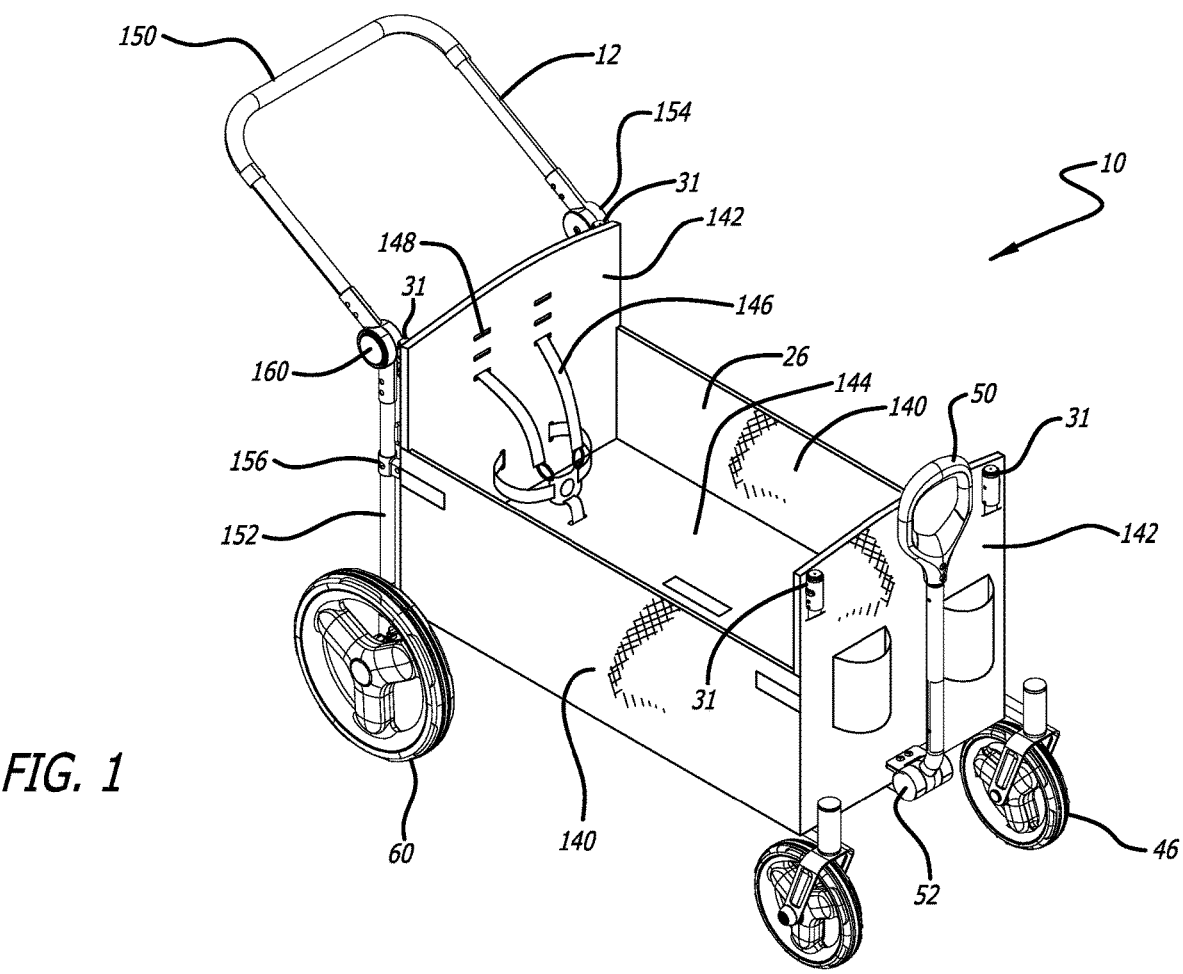
FIG. 1 is a top front perspective view of a folding push-pull wagon according to one embodiment.
Figure 2:
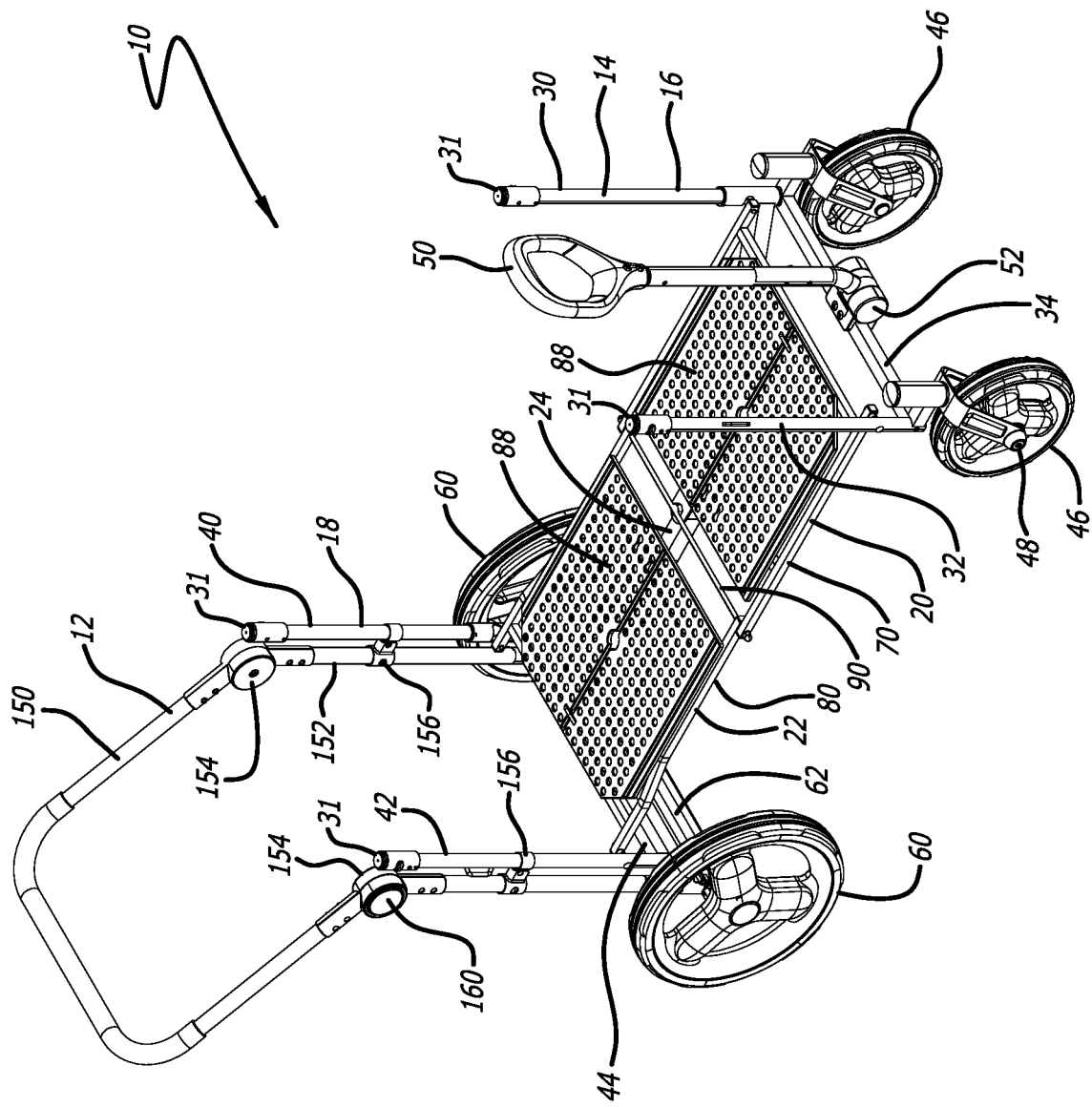
FIG. 2 is a top front perspective view the folding push-pull wagon of FIG. 1.
Figure 3:
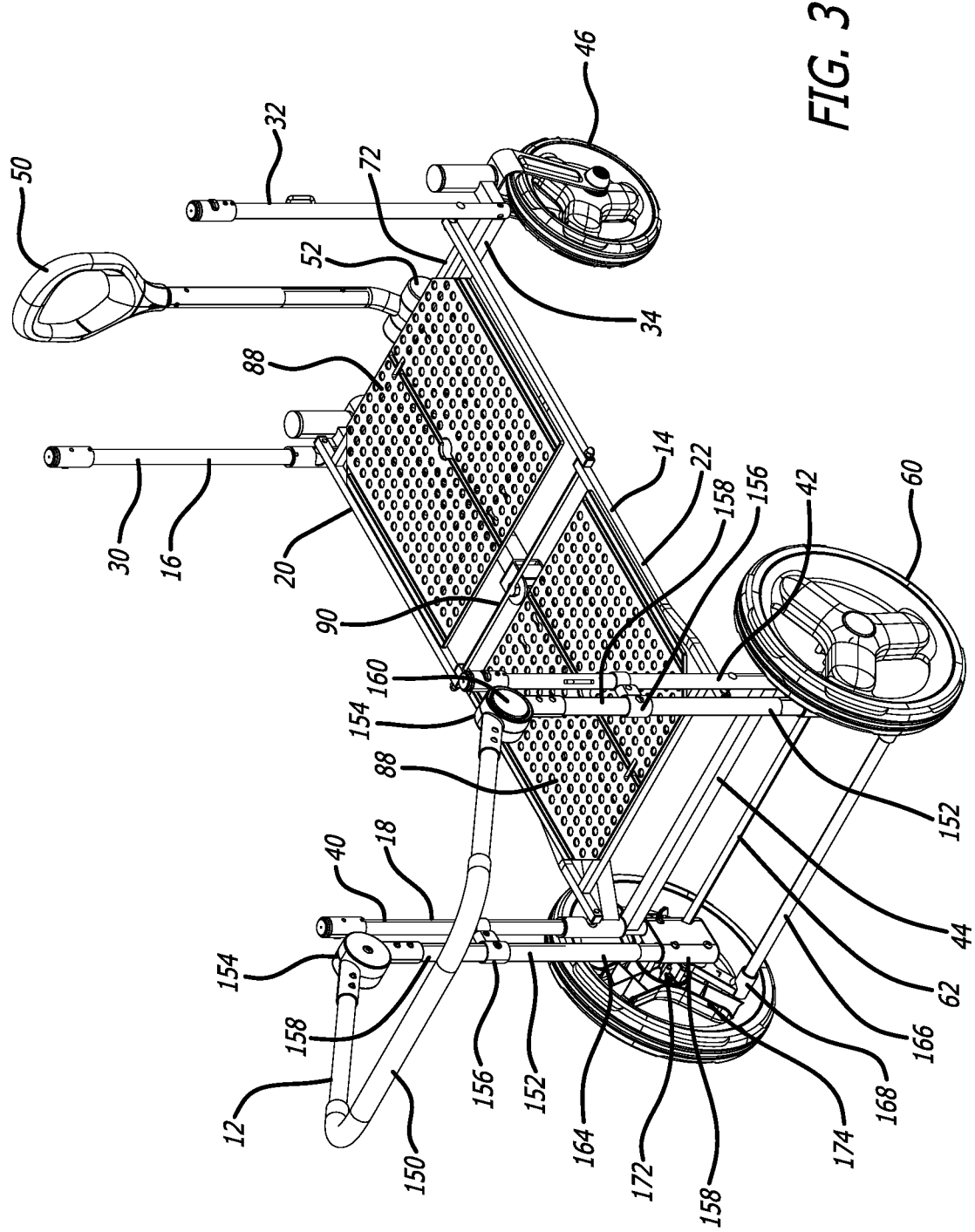
FIG. 3 is a top rear perspective view of the folding push-pull wagon of FIG. 1.

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law. Moreover, it is noted that like reference numerals represent similar parts throughout the several views of the drawings of the disclosure.

Referring now to the figures, and initially to FIGS. 1-4, a push-pull wagon 10 is illustrated. In various embodiments the push-pull wagon 10 may be a foldable push-pull wagon 10 that includes a foldable push bar 12 and a collapsible or foldable frame assembly 14 that is moveable between an unfolded or use configuration (FIGS. 1-4) and a collapsed or folded configuration (FIG. 5). Alternately, however, the frame assembly 14 need not be collapsible or foldable, and the push bar 12 may be used with other types of wagons, including wooden wagons, plastic wagons, and wagons that do not fold.

In one embodiment of the wagon 10, where the wagon 10 is foldable, the frame assembly 14 includes a first end assembly 16, a second end assembly 18, a floor assembly connected to the wagon frame 14 between the first end assembly 16 and the second end assembly 18, and a linkage assembly 24. In one embodiment, the first floor assembly 20 is pivotally connected to and extends from the first end assembly 16, the second floor assembly 22 is pivotally connected to and extends from the second end assembly 18, and the linkage assembly 24 connects the first end assembly 16 to the second end assembly 18. Additionally, as shown in FIG. 1, the foldable wagon 10 includes a flexible housing 26 connected to the foldable frame assembly 14.

In one embodiment, the first end assembly 16 generally comprises two vertical members 30 and 32, connected by a front lower cross support 34 towards a bottom of the two vertical members 30 and 32. Similarly, in one embodiment the second end assembly 18 generally comprises two vertical members 40 and 42, connected by a rear lower cross support 44 towards a bottom of the two vertical members 40 and 42. In one embodiment a canopy assembly (not shown) may be removably connected to telescoping posts 31 that are secured to the wagon frame 14.

In various embodiments, the wagon 10 includes first and second front wheels 46 rotatably and pivotally connected to the frame assembly 14 adjacent the first end assembly 16. The front wheels 46 rotate about their axles 48. In one embodiment the front wheels 46 may be pivotable caster assemblies. In an alternate embodiment the wagon 10 may have few or greater than two front wheels. Additionally, in an alternate embodiment the front wheels may be connected to the handle through a steering mechanism to provide a steerable assembly.

Figure 12:
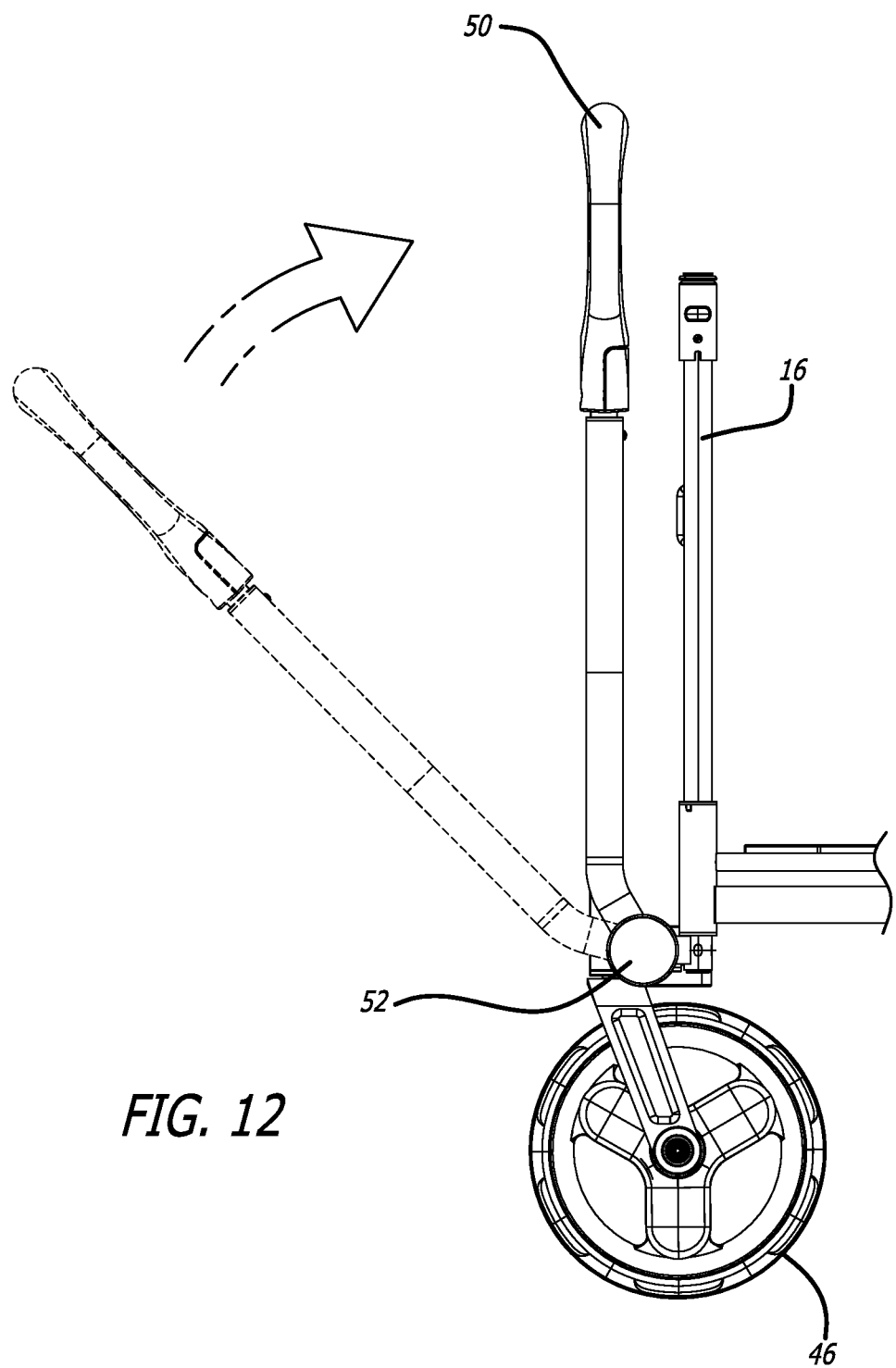
FIG. 12 is a side elevation view of a rotatable pull handle of the folding push-pull wagon of FIG. 1.
Figure 13:
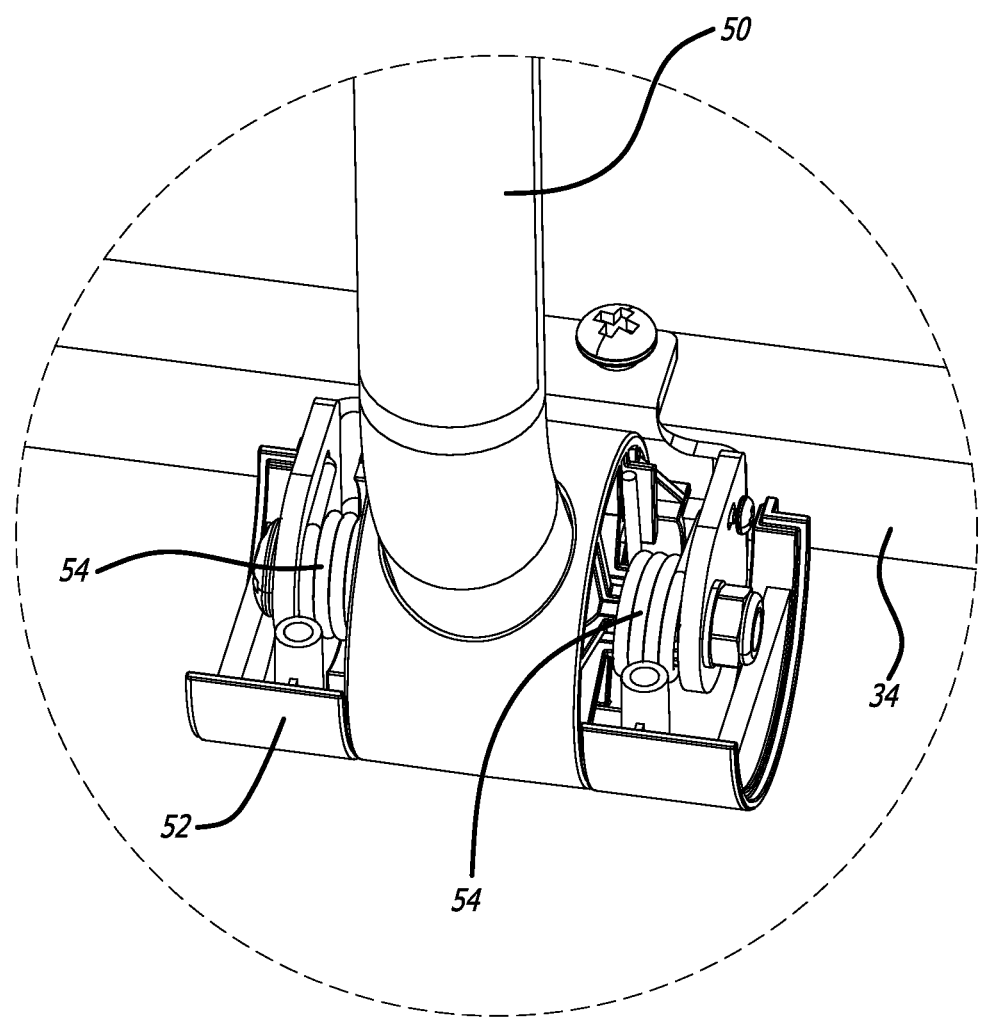
FIG. 13 is a partial front perspective view of one embodiment of the pull handle knuckle with the housing partially removed.
Figure 14:
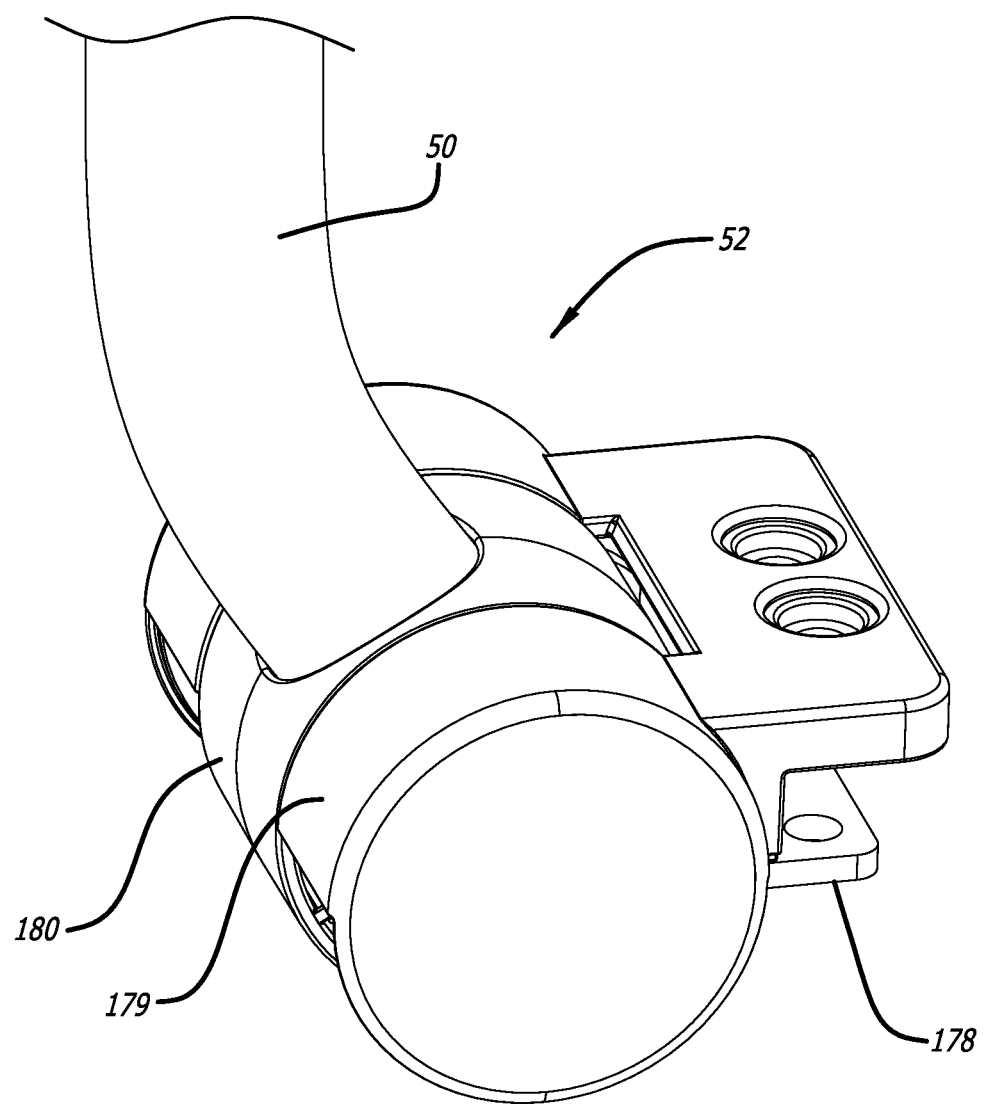
FIG. 14 is a partial front perspective view of another embodiment of the pull handle knuckle.
Figure 15:
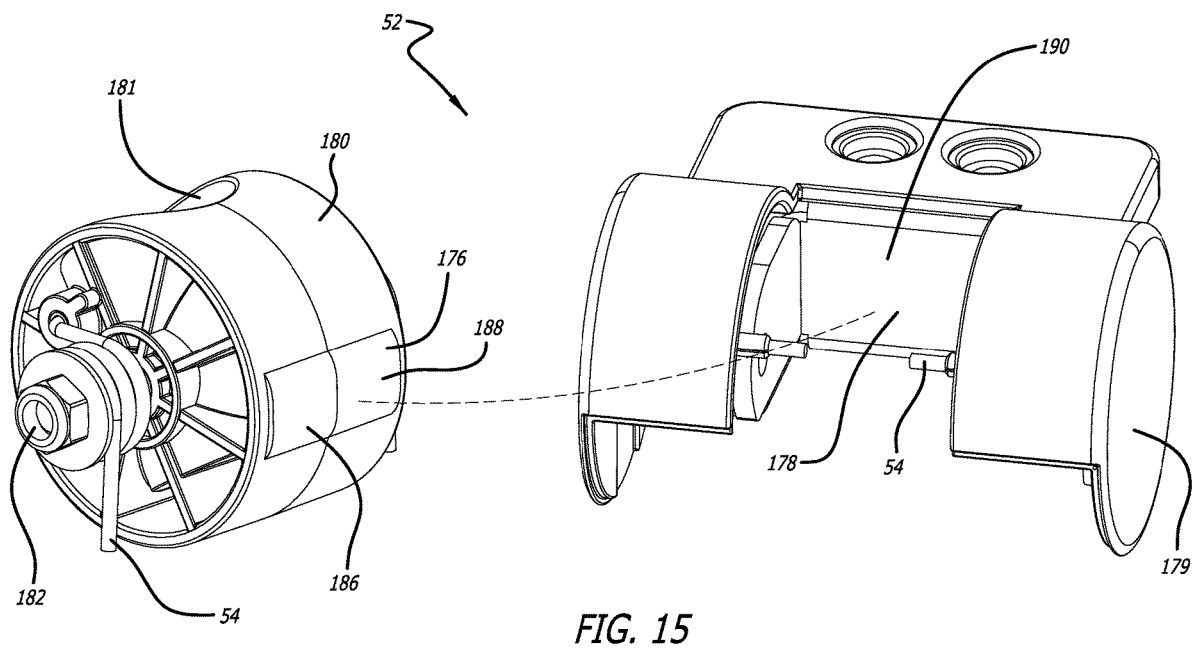
FIG. 15 is a partial exploded perspective view of the pull handle knuckle of FIG. 14.
Figure 16:
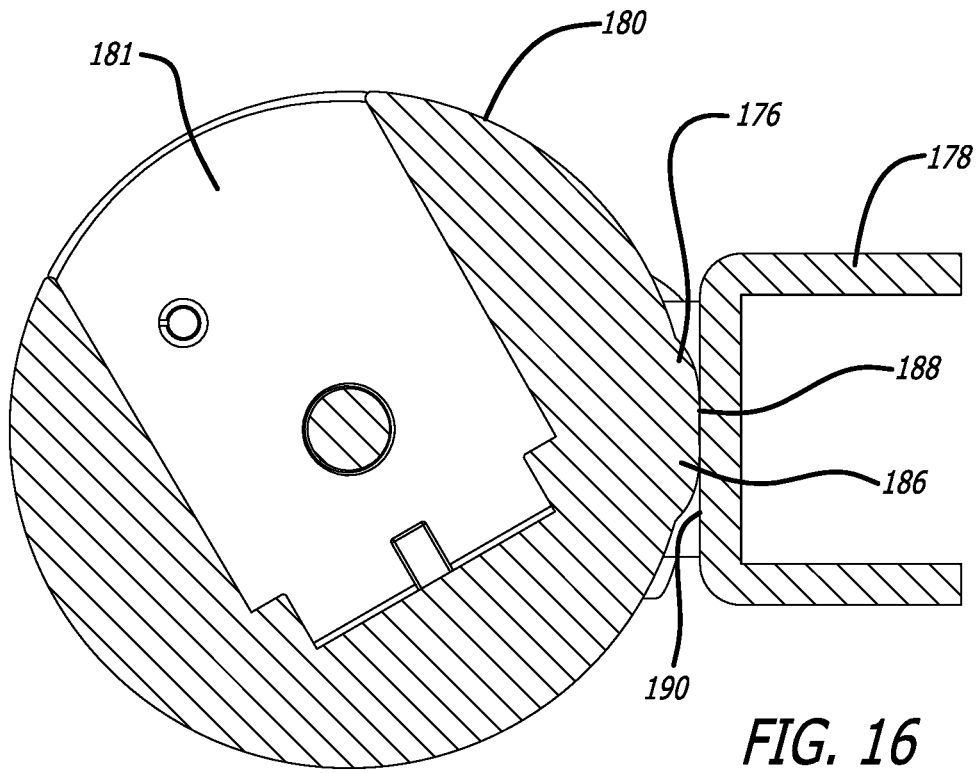
FIG. 16 is a cross sectional view of the pull handle knuckle of FIG. 14 in the locked position.
Figure 17:
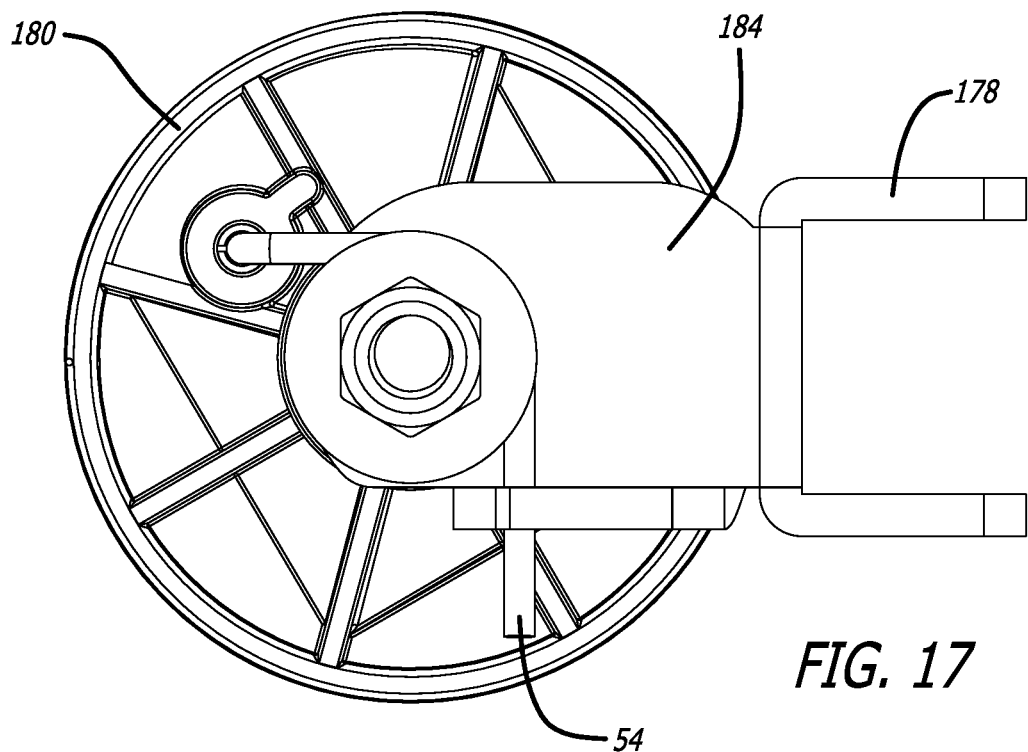
FIG. 17 is a side view of the pull handle knuckle of FIG. 14 with the housing removed.

In one embodiment, the wagon 10 also includes a handle 50 pivotally connected to the first end assembly 16. In one embodiment the handle 50 is pivotally connected to a pivoting knuckle assembly 52. The knuckle assembly 52 may be secured to the front lower cross support 34 of the first end assembly 16. In one embodiment, the handle 50, as shown in FIGS. 12-13, is biased toward the upright/vertical position, and thus toward the first end assembly 17. The knuckle assembly 52 of the handle 50 may be spring loaded and therefore have one or more springs 54, such as torsion springs 54, therein to bias the handle 50 upwardly and toward the first end assembly 16 so that when the handle 50 is not being manipulated by a user, it will remain vertically upward so it will not impede movement of the wagon 10 when the wagon 10 is pushed by a user with the foldable push bar 12 adjacent the second end assembly 18.

The wagon 10 also has first and second rear wheels 60 rotatably connected to the second end assembly 18. In one embodiment, the rear wheels 60 are rotationally connected to a fixed axle 62, however, in alternate embodiments the rear wheels 60 are connected to separate axles that are rotationally connected at opposing sides of the second end assembly 18.

As shown in FIGS. 2-5, in one embodiment the first floor assembly 20 is pivotally connected to and extends from the first end assembly 16. The first floor assembly 20 generally comprises two side members 70, a first end member 72, a second end member 74, and a plurality of central support members 76. In one embodiment the first end member 72 is pivotally connected between the two vertical members 30, 32 of the first end assembly 16. Shoulder bolts or other fastening mechanisms may be used to pivotally connect the first end member 72 between and to the two vertical members 30, 32 of the first end assembly 16. The two side members 70 are preferably fixed adjacent opposing ends of the first end member 72 and extend toward a center of the floor of the wagon 10. The second end member 74 and a plurality of central support members 76 are utilized to provide rigidity to the first floor assembly 20.

Similarly, the second floor assembly 22 of the various embodiments is pivotally connected to and extends from the second end assembly 18. The second floor assembly 22 generally comprises two side members 80, a first end member 82, a second end member 84, and a plurality of central support members 86. In one embodiment the first end member 82 is pivotally connected between the two vertical members 40, 42 of the second end assembly 18. Shoulder bolts or other fastening mechanisms may be used to pivotally connect the first end member 82 between and to the two vertical members 40, 42 of the second end assembly 18. The two side members 80 are preferably fixed adjacent opposing ends of the second end member 82 and extend toward a center of the floor of the wagon 10. The second end member 84 and a plurality of central support members 86 are utilized to provide rigidity to the second floor assembly 22. In one embodiment, floor panels 88 may be secured to a top of the floor assemblies 20, 22 to provide a base or floor for the wagon 10, on which the flexible housing 26 may rest.

In one embodiment, the first and second floor assemblies 20, 22 are connected at a center brace 90. Preferably, the center brace 90 may be pivotally connected to the first floor assembly 20 and the second floor assembly 22 to allow the first floor assembly 20 to be pivotally connected to the second floor assembly 22. In one embodiment, the center brace 90 is an elongated member, such as a round or other shaped tube or solid member, that extends to connect each of the side members 70 and 80 of the first and second floor assemblies 20, 22 thereto. Additionally, in a preferred embodiment, the width of at least a portion of the first floor assembly 20 is greater than the width of at least a portion of the second floor assembly 22 to allow for at least a portion of the side members 70 of the first floor assembly 20 to be exterior but adjacent the side members 80 of the second floor assembly 20 for clearance purposes. The first and second floor assemblies 20, 22 define the floor of the wagon 10.

Figure 4:
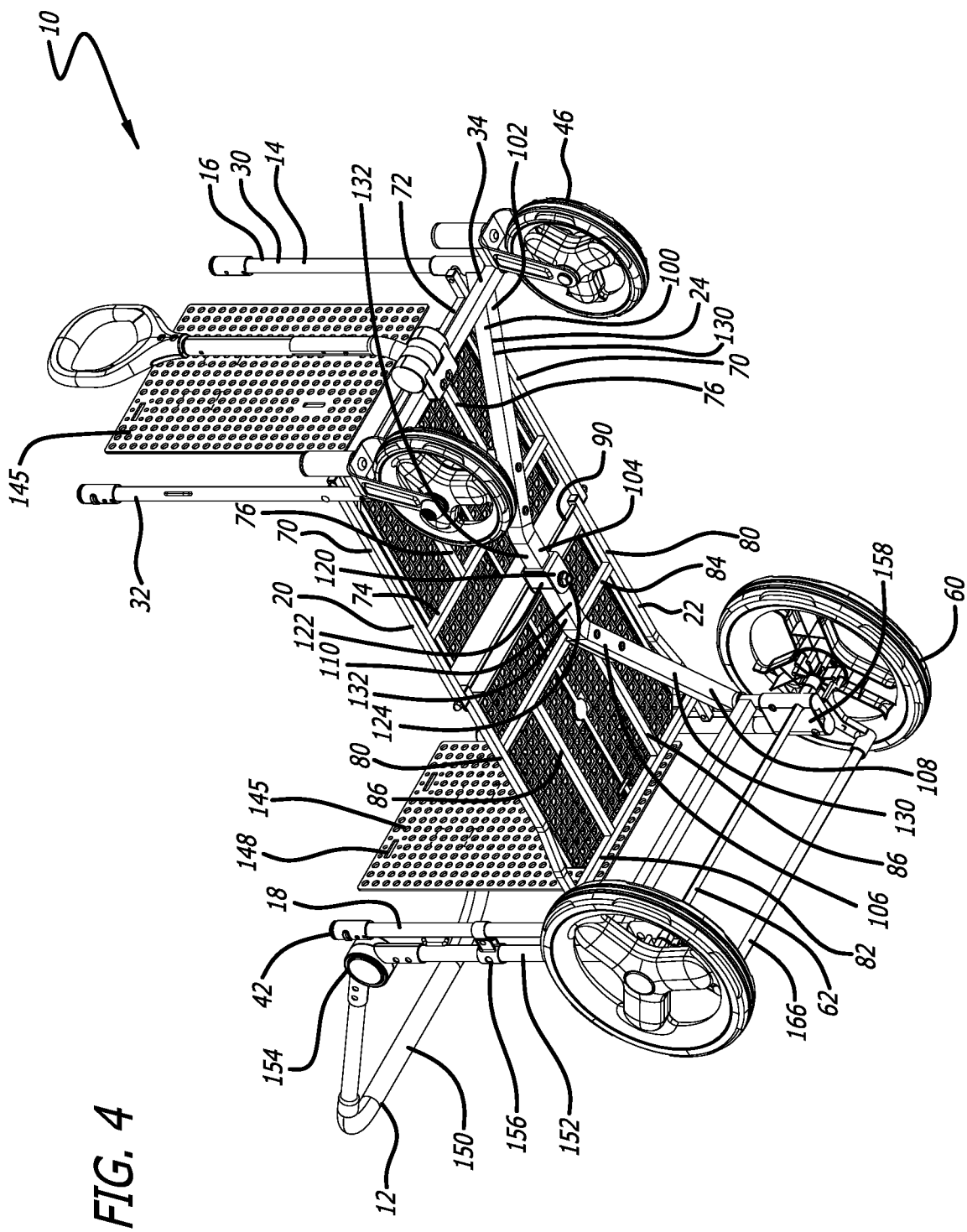
FIG. 4 is a bottom front perspective view of the folding push-pull wagon of FIG. 1.
Figure 5:
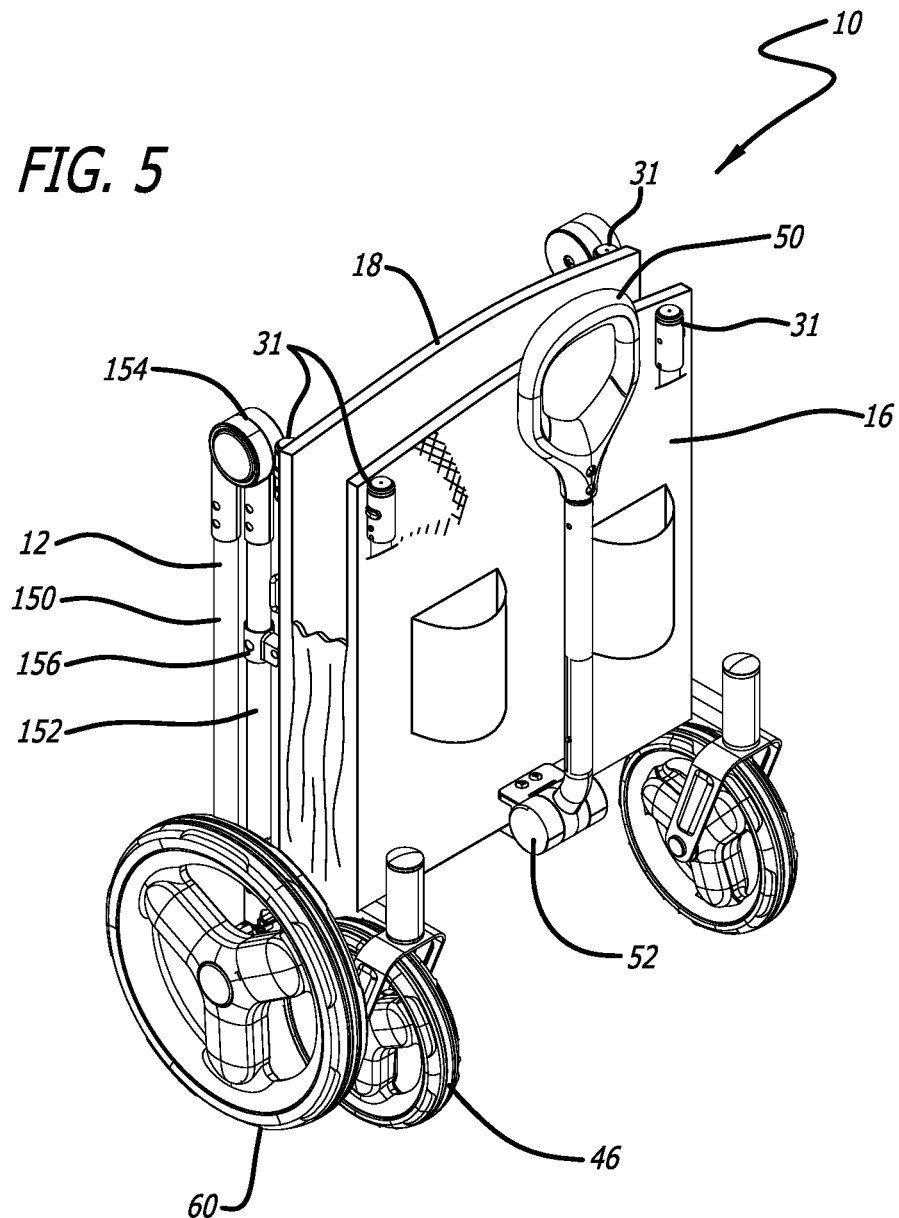
FIG. 5 is front top perspective view of the folding push-pull wagon of FIG. 1 in the folded orientation.
Figure 6:
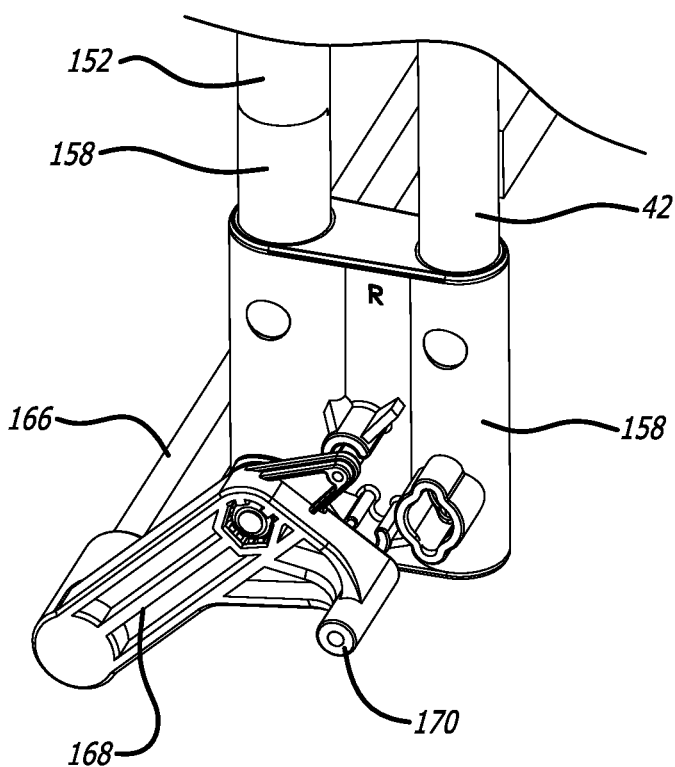
FIG. 6 is a top side perspective view of an integrated brake push-bar bracket for the folding push-pull wagon according to one embodiment.
Figure 7:
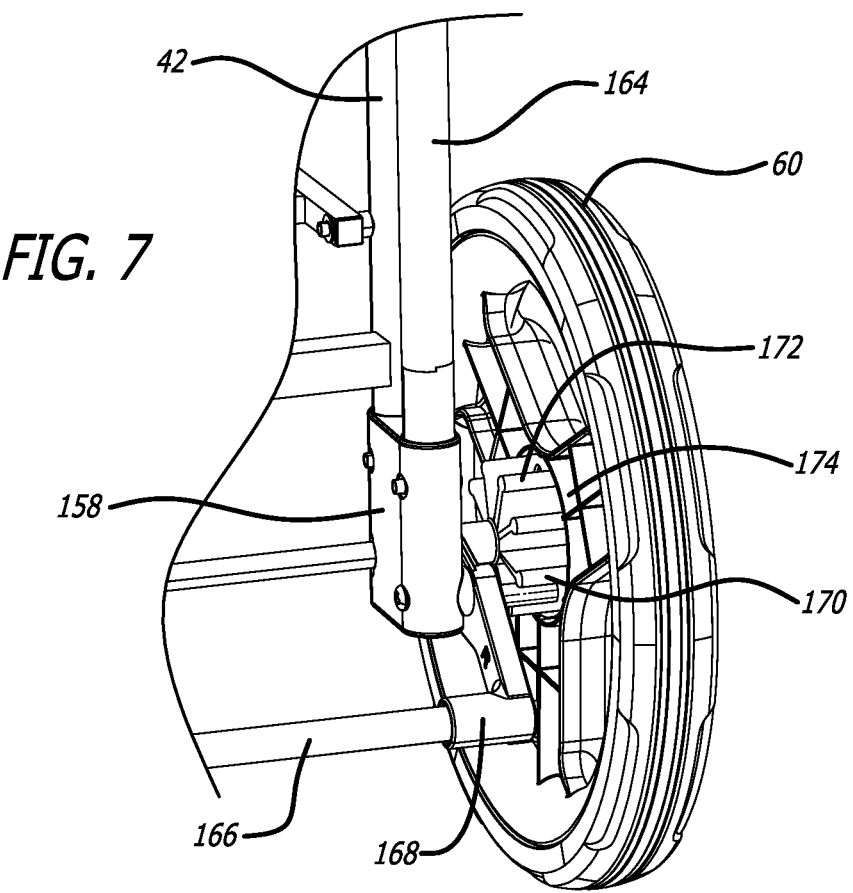
FIG. 7 is a top rear perspective view of the brake assembly for the folding push-pull wagon according to one embodiment.
Figure 8:
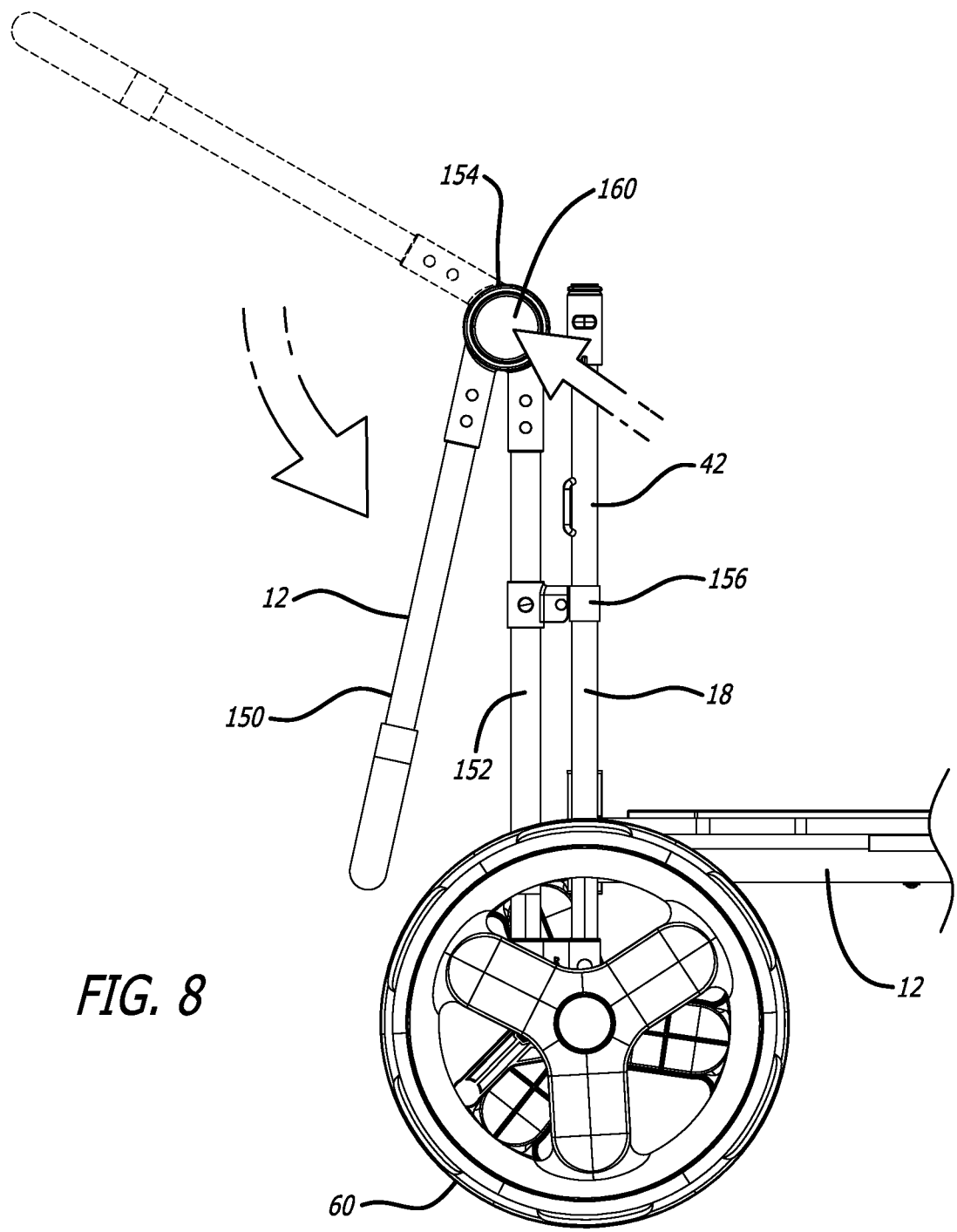
FIG. 8 is a side elevation view of the push-pull bar of the folding push-pull wagon of FIG. 1, with the push-pull bar in various orientations.
Figure 9:
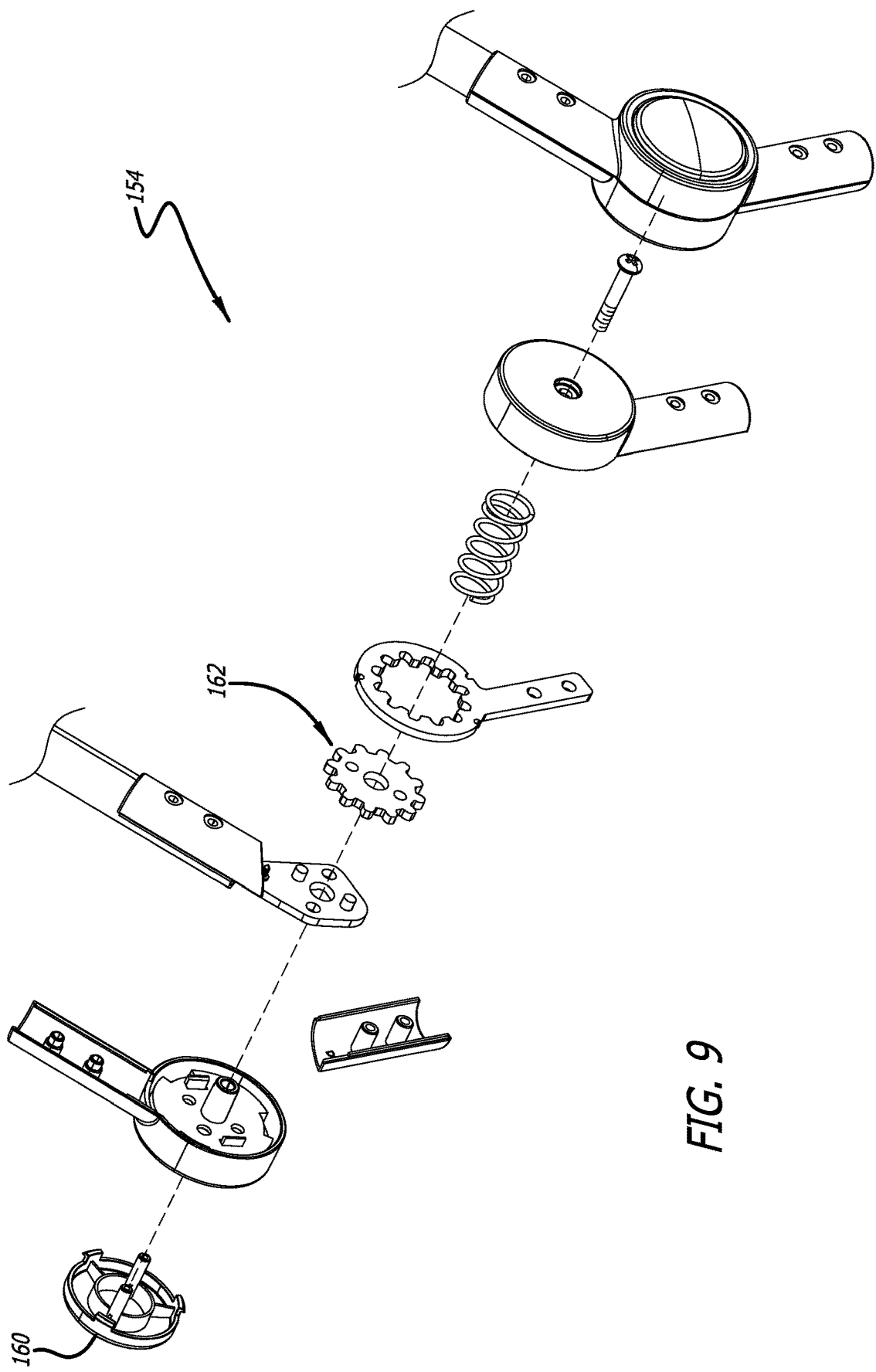
FIG. 9 is an exploded view of the folding mechanism of the push-pull bar of the folding push-pull wagon of FIG. 1.
Figure 10:
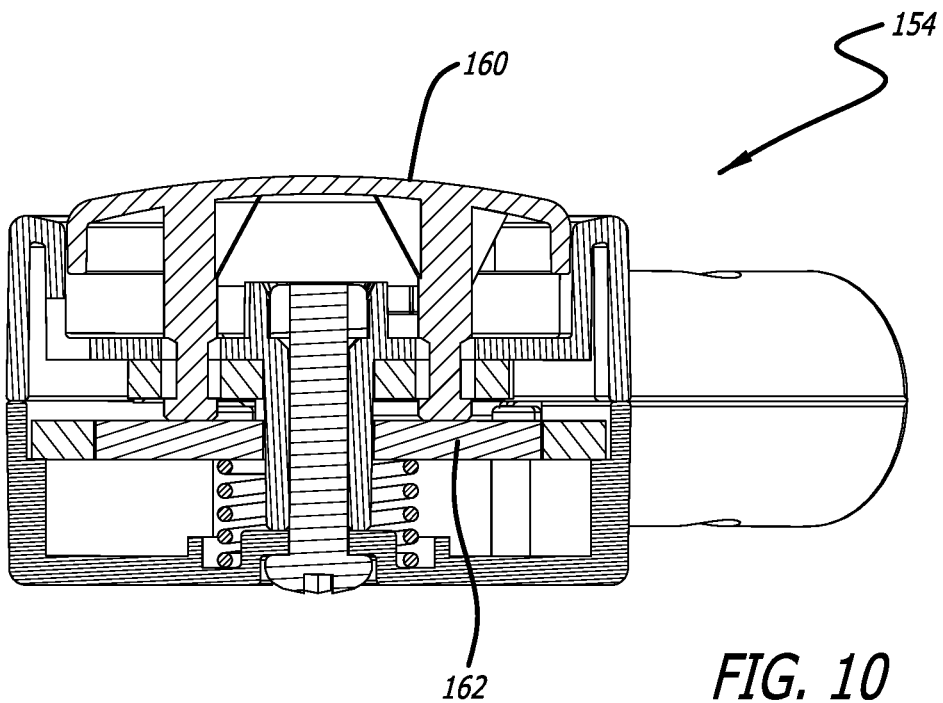
FIG. 10 is a cross sectional view of the folding mechanism of FIG. 9 in the locked orientation.

As best shown in FIG. 4, in one embodiment the linkage assembly 24 is provided under the floor assembly, connects the first end assembly 16 to the second end assembly 18, and provides rigidity to the wagon 10 in both the open and closed configurations, but also allows the wagon 10 to be collapsed or folded such that the first end assembly 16 and second end assembly 18 are adjacent one another (see FIG. 5). In one embodiment the linkage assembly 24 comprises a first end linkage 100 and a second end linkage 106. The first end linkage 100 has a first end 102 and a second end 104. The first end 102 of the first end linkage 100 is pivotally connected to the first end assembly 16. The second end linkage 106 has a first end 108 and a second end 110. The first end 108 of the second end linkage 106 is pivotally connected to the second end assembly 18.

Further, in one embodiment the second end 104 of the first end linkage 100 is pivotally connected to the second end 110 of the second end linkage 106. In one embodiment, as shown in FIG. 4, the pivot connection 118 between the first end linkage 100 and the second end linkage 106 is that of a clevis and tang orientation. For example, one of the second end 104 of the first end linkage 100 or the second end 110 of the second end linkage 106 has a clevis 120, and the other of the second end 104 of the first end linkage 100 or the second end 110 of the second end linkage 106 has a tang 122 that fits within the clevis 120. A pin 124 joins the clevis 120 and tang 122, and allows the first end linkage 100 and the second end linkage 106 to pivot with respect to one another during opening and closing of the wagon 10. The first end linkage 100 and the second end linkage 106 form a two-bar linkage to assist in keeping the first end assembly 16 secured to the second end assembly 18 in both the open configuration and the collapsed configuration, as well as in the transition between the open and collapsed configuration. Further, in a preferred embodiment, the first end linkage 100 and the second end linkage 106 each have a first section 130 that extends at an angle to the first and second end assemblies 16, 18, and a second section 132 that extends generally parallel to the longitudinal axis of the wagon 10. The second sections 132 meet at the pivot connection 118 between the first and second end linkages 100, 106.

In one embodiment, the wagon 10 also includes a housing assembly 26 on the wagon frame that defines sidewalls and preferably a bottom or floor of the wagon 10. In a preferred embodiment, the housing assembly 26 is made of fabric and is referred to as the flexible housing 26. As shown in FIG. 1, the flexible housing 26 preferably includes side portions 140, end portions 142 and a bottom wall 144 or floor 144. Additionally, in a preferred embodiment, the end portions 142 of the housing assembly 26 have rigid wall members therein 145 (see FIG. 4). The wagon 10 may also have safety belts 146 that secure through the end portions 142 of the flexible housing 26 and to the rigid wall members 145. In one embodiment, the safety belts 146 are 5-point safety belts 146 that are adjustable to the size of the child in the wagon 10 with the use of openings 148 at varying heights along the end portions 142 and rigid wall members 145 as shown in FIG. 1.

It is also understood that the wagon 10 may be operated without a housing assembly 26. In this orientation, the wagon frame 14 would provide structure for hauling whatever the user desires.

As shown in the figures, the wagon 10 also includes a push bar 12 that may be foldable, or put another way lockably positionable in a plurality of angularly located use positions and a storage position. The push bar 12 may comprise an upper push handle 150 and first and second lower push bar supports 152. In one embodiment, the push handle 150 is pivotally connected to the second end assembly 18, including in one embodiment with a ratchet mechanism 154. Further, in one embodiment the push handle 150 is connected to the first and second lower push bar supports 152 at a pair of pivotable mechanisms 154, such as pivotable ratchet mechanisms 154.

In one embodiment the push bar 12 is pivotally connected to the second end assembly 18. Further, in one embodiment the push bar 12 is secured to the wagon frame 14 via first and second upper connectors 156 and first and second lower connectors 158. As shown in FIGS. 2-5 and 8, in one embodiment, one of the upper connectors 156 secures the first lower push bar support 152 to the vertical member 40 of the wagon frame 14, and the other of the upper connectors 156 secures the second lower push bar support 152 to vertical member 42 of the wagon frame 14. In such an embodiment, the lower push bar supports 152 are secured to the wagon frame 14 a distance behind the wagon frame 14.

The upper push handle 150 may generally comprise a U-shaped member. In such an embodiment, one pivotable ratchet mechanism 154 is provided at a first end 158 of the first lower push bar support 152 and another pivotable ratchet mechanism 154 is provided at a first end 158 of the second lower push bar support 152. The two pivotable ratchet mechanisms 154 then secure to the two ends of the upper push handle 150.

Figure 11:
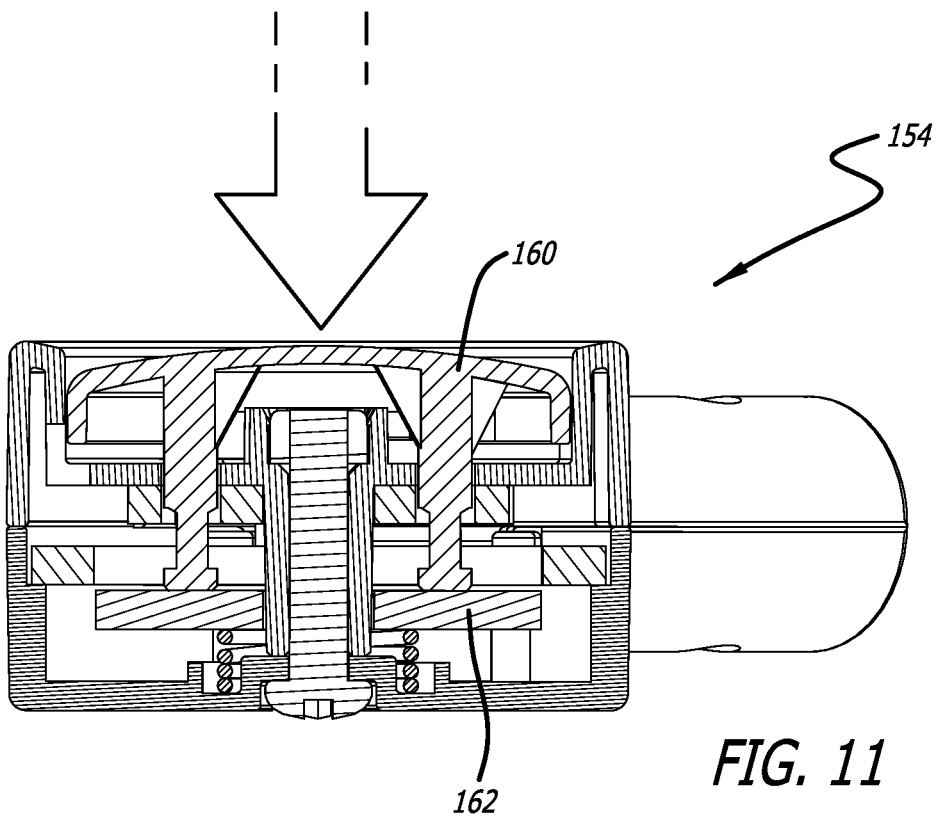
FIG. 11 is a cross sectional view of the folding mechanism of FIG. 9 in the unlocked orientation.

In one embodiment, as shown in FIGS. 8-11, the pivotable ratchet mechanisms 154 have a spring loaded button 160 to disengage the ratchet 162 in the ratchet mechanism 154 to adjust an angular position of the push bar 12. By depressing the button 160 on each ratchet mechanism 154, as shown in FIG. 11, the ratchet mechanism 154 is able to adjust and lock the push handle 150 into a variety of positions for height adjustability in the use position as shown in FIG. 104. Additionally, the ratchet mechanism 154 allows the push handle 150 to be placed into a storage position as FIGS. 5 and 8 when the handle 150 is folded adjacent the first and second lower push bar supports 152.

In one embodiment, the first lower connector 158 secures a second end 164 of the first lower push bar support 152 to vertical member 40 of the wagon frame 14, and the second lower connector 158 secures a second end 164 of the second lower push bar support 152 to vertical member 42 of the wagon frame 14 at the second end assembly 18 of the wagon 10. The lower connectors 158 also have openings to allow the rear axle 62 to extend through the connectors 158 and to be secured to the vertical members 40, 42.

The first and second lower connectors 158 are also referred to as brake push-bar brackets 158. That is because in one embodiment the lower connectors 158 pivotally support a brake bar 166 via brake brackets 168. The brake bar is operable by a foot of a user. The brake brackets 168 each have a pin 170 that engage spokes 172 in the wheel hubs 174 to lock the wheel hub 174 with respect to the brake bar 166 and prevent the rear wheels 60 from rotating.

Referring to FIGS. 12-17, in an alternate embodiment, knuckle assembly 52 for the wagon handle 50 also has a cam feature 176 to further secure the handle 50 in the up position. The knuckle assembly 52 generally comprises a bracket 178, a housing 179, a pivot member 180 pivotally secured to the bracket 178 with a shaft 182, and a pair of springs 54 to bias the pivot member 180 and handle 50 toward the upright/vertical position. The pivot member 180 has an opening 181 to receive and secure the handle 50 therein. Preferably, the bracket 178 is secured to the front lower cross support 34. In one embodiment, the bracket 178 has ears 184 to support the shaft 182 for pivotally supporting the pivot member 180. The pivot member 180 may be biased toward the upright/vertical position with the use of one or more springs 54, such as torsion springs 54, that are connected to the bracket 178 and the pivot member 180. The springs 54 bias the handle 50 generally vertically upwardly and toward the first end assembly 16 when the handle 50 is not being manipulated by a user so that the handle 50 will not impede movement of the wagon 10 when the wagon 10 is pushed by a user with the foldable push bar 12 adjacent the second end assembly 18.

A cam feature 176 or cam surface 176 is preferably provided on a surface of the pivot member 180. In one embodiment, the cam feature 176 is a raised protrusion 186 extending from the arcuate outer surface of the pivot member 180. Preferably, the raised protrusion 186 has a generally flat surface 188 at a center thereof. The flat surface 188 of the raised protrusion 186 operates as a stop when it engages the mating wall 190 of the bracket 178. The cam surface 176 helps to removably secure the handle 50 in a vertical position.

Thus, the bias springs 54 will bias the handle 50 toward the upright position. However, the force of the bias springs 54 may not be sufficient to overcome the interference force of the mating wall 190 against the edge 192 of the cam 176. To overcome the interference force, the user will have to further rotate the handle 50 with sufficient force to rotate the pivot member 180 with its cam 176, and at a certain rotation the flat 188 of the cam 176 will engage, in a snap-like manner, the mating wall 190 of the bracket 178 to retain the handle 50 in the generally vertical position. To rotate the handle 50 from the generally vertical position to a more horizontal position, the user will likewise have to use a sufficient force to overcome the interference force of the mating wall 190 against the cam 176 in the reverse pivot rotation.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase (s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A wagon comprising:
    a wagon frame having a first end assembly and an opposing second end assembly;
    a floor assembly connected to the wagon frame between the first end assembly and the second end assembly, wherein the wagon frame folds between an open configuration and a folded configuration;
    first and second rear wheels rotatably connected to the wagon frame adjacent the second end assembly;
    first and second front wheels rotatably and pivotally connected to the wagon frame adjacent the first end assembly;
    a push bar pivotally connected to the second end assembly, the push bar lockably positionable in a plurality of use positions and a storage position; and,
    a handle pivotally connected to the first end assembly at a pivot assembly, the pivot assembly having a spring that biases the handle toward the first end assembly, wherein the handle has a pivot member with a cam to removably secure the handle in a vertical position, and wherein the cam is a raised protrusion extending from an arcuate outer surface of the pivot member, wherein the cam has a planar surface toward a center thereof that engages a mating wall, and wherein the planar surface of the cam is not arcuate.

2. The wagon of claim 1, further comprising a fabric housing on the wagon frame.

3. The wagon of claim 1, wherein the push bar is connected to the second end assembly with a ratchet mechanism.

4. The wagon of claim 3, further comprising a spring-loaded button to disengage a ratchet in the ratchet mechanism to adjust an angular position of the push bar.

5. The wagon of claim 1, further comprising a foot activated brake mechanism adjacent the second end assembly to rotationally lock at least one of the rear wheels.

6. The wagon of claim 1, further comprising a removable canopy connected to telescoping posts that are secured to the wagon frame.

7. The wagon of claim 1, wherein the floor assembly comprises a first floor assembly pivotal with respect to the first end assembly, and a second floor assembly pivotal with respect to the second end assembly, and wherein the first floor assembly is pivotable with respect to the second floor assembly to allow for folding of the wagon frame.

8. The wagon of claim 7, further comprising a linkage assembly under the floor assembly, the linkage assembly having a first linkage pivotally connected to the first end assembly and a second linkage pivotally connected to the second end assembly, wherein the first linkage is also pivotally connected to the second linkage.

9. A wagon comprising:
a wagon frame having a first end assembly and an opposing second end assembly;
first and second rear wheels rotatably connected to the wagon frame adjacent the second end assembly;
first and second front wheels rotatably and pivotally connected to the wagon frame adjacent the first end assembly;
a handle pivotally connected to the first end assembly at a pivot assembly, the pivot assembly having a spring that biases the handle toward the first end assembly, wherein the handle has a pivot member with a cam to removably secure the handle in a vertical position, wherein the cam is a raised protrusion extending from an outer surface of the pivot member, and wherein the cam has a planar surface toward a center thereof that engages a mating wall.

10. The wagon of claim 9, further comprising a push bar pivotally connected to the second end assembly with a ratchet mechanism, wherein the push bar is lockably positionable in a plurality of angularly located use positions via the ratchet mechanism.

11. The wagon of claim 9, wherein the wagon frame folds between an open configuration and a folded configuration, wherein the wagon frame has a floor assembly between the first end assembly and the second end assembly, wherein the floor assembly comprises a first floor assembly pivotal with respect to the first end assembly, and a second floor assembly pivotal with respect to the second end assembly, and wherein the first floor assembly is pivotable with respect to the second floor assembly to allow for folding of the wagon frame, wherein the wagon frame further has a linkage assembly under the floor assembly, the linkage assembly having a first linkage pivotally connected to the first end assembly and a second linkage pivotally connected to the second end assembly, wherein the first linkage is also pivotally connected to the second linkage.

12. The wagon of claim 10, further comprising a spring-loaded button to disengage a ratchet in the ratchet mechanism to adjust the angularly located use position of the push bar.

13. A wagon comprising:
a wagon frame having a first end assembly and an opposing second end assembly;
first and second rear wheels rotatably connected to the wagon frame adjacent the second end assembly;
first and second front wheels rotatably and pivotally connected to the wagon frame adjacent the first end assembly;
a push bar connected to the wagon frame; and,
a handle pivotally connected to the first end assembly at a pivot assembly, the pivot assembly having a raised cam with a planar portion that is not arcuate, and wherein the planar portion engages a mating wall to retain the handle in a vertical position.

14. The wagon of claim 13, wherein the handle has a pivot member with the cam extending from an arcuate outer surface of the pivot member.

15. The wagon of claim 13, wherein the push bar is connected to the second end assembly with a ratchet mechanism, and wherein the push bar is lockably positionable in a plurality of angularly located use positions via the ratchet mechanism.

16. The wagon of claim 13, wherein the wagon frame has a floor assembly having a first floor assembly pivotal with respect to the first end assembly and a second floor assembly pivotal with respect to the second end assembly, and wherein the first floor assembly is pivotable with respect to the second floor assembly to allow for folding of the wagon frame.

* * * * *

UNITED STATES PATENT AND TRADEMARK OFFICE
CERTIFICATE OF CORRECTION

| | | |
|---|---|---|
| PATENT NO. | : 12,365,379 B2 | Page 1 of 1 |
| APPLICATION NO. | : 17/689370 | |
| DATED | : July 22, 2025 | |
| INVENTOR(S) | : Samantha Sturgeon | |

It is certified that error appears in the above-identified patent and that said Letters Patent is hereby corrected as shown below:

On the Title Page

Item (73) Assignee, Please change "Leapfrog Product Development LLC" to --The Radio Flyer Company--.

Signed and Sealed this
Seventh Day of October, 2025

John A. Squires
*Director of the United States Patent and Trademark Office*